(12) United States Patent
Heberlein, Jr. et al.

(10) Patent No.: US 7,237,134 B2
(45) Date of Patent: Jun. 26, 2007

(54) BACKUP POWER MODULE FOR INDUSTRIAL CONTROL AND MONITORING NETWORK

(75) Inventors: G. Erich Heberlein, Jr., Oconomowoc, WI (US); David L. Jensen, Barneveld, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 580 days.

(21) Appl. No.: 09/953,118

(22) Filed: Sep. 12, 2001

(65) Prior Publication Data

US 2003/0051175 A1 Mar. 13, 2003

(51) Int. Cl.
*G06F 1/00* (2006.01)
*H02J 7/00* (2006.01)
*G06B 23/00* (2006.01)

(52) U.S. Cl. .............. 713/340; 713/300; 713/330; 307/65; 307/64; 340/693.2

(58) Field of Classification Search ........ 713/300–340; 307/64–66, 150; 340/693.2
See application file for complete search history.

(56) References Cited

U.S. PATENT DOCUMENTS

| | | | |
|---|---|---|---|
| 3,723,852 A | 3/1973 | Peterson et al. | |
| 4,155,081 A * | 5/1979 | Haglund | 340/629 |
| 4,315,162 A | 2/1982 | Ferguson | |
| 4,827,244 A * | 5/1989 | Bellavia et al. | 340/514 |
| 5,107,446 A * | 4/1992 | Shaw et al. | 340/514 |
| 5,553,006 A * | 9/1996 | Benda | 700/276 |
| 5,574,436 A * | 11/1996 | Sisselman et al. | 340/663 |
| 5,705,979 A * | 1/1998 | Fierro et al. | 340/517 |
| 5,745,355 A * | 4/1998 | Tracy et al. | 363/71 |
| 5,811,895 A | 9/1998 | Suzuki et al. | |
| 6,163,086 A | 12/2000 | Choo | |
| 6,179,644 B1 | 1/2001 | Adams et al. | |
| 6,225,708 B1 | 5/2001 | Furukawa et al. | |
| 6,232,557 B1 * | 5/2001 | Lounsbury et al. | 174/117 F |
| 6,311,279 B1 * | 10/2001 | Nguyen | 713/300 |
| 6,315,211 B1 * | 11/2001 | Sartain et al. | 236/46 R |
| 6,337,563 B2 * | 1/2002 | Takimoto et al. | 323/284 |
| 6,643,566 B1 * | 11/2003 | Lehr et al. | 700/286 |
| 6,691,248 B1 * | 2/2004 | Nishijima et al. | 714/14 |

* cited by examiner

*Primary Examiner*—Kim Huynh
*Assistant Examiner*—Alan S. Chen
(74) *Attorney, Agent, or Firm*—Patrick S. Yoder; Alexander M. Gerasimow

(57) ABSTRACT

A technique is provided for applying secondary or backup power to a networked device in the event of a loss or malfunction of network power. In a control and monitoring network. Various devices may receive both power and data signals from a network cable. In the event of loss of network power, or the reduction in network power, the devices can automatically and without interruptions seek power from the secondary power source.

28 Claims, 7 Drawing Sheets

BACKUP POWER MODULE FOR INDUSTRIAL CONTROL AND MONITORING NETWORK

BACKGROUND OF THE INVENTION

The present invention relates generally to the field of control and monitoring networks, such as those used for industrial applications. More particularly, the invention relates to a technique for providing power to networked devices and for switching the application power to a secondary or backup supply in the event of a malfunction in a normal device power supply, such as over the network.

A range of networks are known and are presently in use for industrial control and monitoring operations. In many such systems, fairly complex monitoring and control functions are designed around specific networks components which are linked to one another via a power and data signal network. For example, in industrial manufacturing, material handling, and other applications, a wide range of prime movers, typically electric motors, as well as actuators, valves, and so forth, may be operated based upon signals from networked devices. The status of the physical system is then indicated back to control devices via input and output modules. Based upon such status signals, the processes may be regulated and controlled to a high degree with enhanced performance and efficiency.

Devices networked in industrial settings may include industrial computers, typically in the form of programmable logic devices, as well as microcontrollers, switch gear, protective devices, and the like. In a motor control center, for example, motor starters, motor controllers, contactors, circuit interrupters, circuit breakers, and so forth provide for regulation of speeds of electric motors used in complex manufacturing and material handling operations. The function of the various components is coordinated so as to provide for operation during normal service, as well as for some type of failure mode operation, or "controlled shutdown". In certain industrial networks of this type, both power for operation of these devices, and data signals for exchanging command and feedback signals, are provided via the network.

Where operation of a networked monitoring or control component relies upon application of power and data signals via a network connection, difficulties can arise if a power supply is interrupted or if the distribution media become severed or inoperative. While increasingly intelligent devices are provided in such networks, enabling preprogramming of certain failure modes from a logical standpoint, a loss of power to the devices may jeopardize the ability to carry out such operations. In certain known systems, for example, cabling is employed for applying both direct current power and data signals to devices. Certain failure modes are pre-programmed into the devices for their logical operation, but a loss of power from the network can result in the inability of the device to perform its failure mode functions, particularly over an extended period of time. Similarly, in a network setting certain devices may be programmed for some type of "controlled shutdown," but that typically requires power during at least a limited duration for operation of the devices.

There is a need, therefore, for a technique that allows for control and monitoring functions to be maintained in such networks even if power from the network becomes interrupted or is insufficient to provide for normal operation of the networked devices. There is a particular need for a technique which offers an array of backup power sources, depending upon the backup power availability, and which can be interfaced with conventional network cabling and power sources to afford a reliable backup power supply in the event of loss of network power.

SUMMARY OF THE INVENTION

The present invention provides a novel technique for providing backup power to networked devices designed to respond to such needs. The technique may be applied in a wide range of settings, and is particularly well-suited to industrial control and monitoring networks in which both power and data signals are applied to networked devices via a network cable. A backup or secondary power module is configured to receive power from a backup or secondary source which supplements the power received from the network. That is, depending upon the nature of the secondary power source, secondary power is conditioned to a level sufficient and appropriate for operation of the networked devices. The backup power is then available to a device in the event of an interruption or malfunction in the power available from the network. Transition from application of power from the network to the device and application of power from the secondary source to the device is seamless, as is transition back from the secondary source to the network source in the event of restoration of network power.

The present technique is particularly well-suited to packaging within add-on modules which can be associated with one or more networked devices. Where particularly application-sensitive devices are employed in a network, for example, and certain failure mode programming is performed and stored directly in the devices, the backup power modules provide for automatic transition of the application of power to such devices in the event of a malfunction of network power. Such malfunctions may include actual severing or destruction of cabling or connectors, a loss of a power supply, malfunction in a power supply, and so forth. Moreover, the module may be provided at or near certain devices to substantially reduce the risk of failure due to physical interruption of power between the devices and the module.

In accordance with certain aspects of the present technique, power is provided from a backup or secondary source at a voltage level which can be compared to a voltage level of power from a network source. Based upon the comparison, transition can be made from the network source to the backup or secondary source if needed. Various exemplary embodiments have been envisioned for the secondary power conditioning circuitry, depending upon the type and nature of the secondary power available. The module may be added to existing equipment, such as between a network link and one or more networked devices. Again, the location of the backup power supply module may be within close proximity to the networked device to assure reliability of backup power. Application of power and/or data signals may pass through the device during normal operation, and secondary or backup of power pass through the device during periods when network power is absent or insufficient. Various alarm or visual indicators may be provided for informing operations personnel of transitions between normal power application and backup power application.

BRIEF DESCRIPTION OF THE DRAWINGS

The foregoing and other advantages of the invention will become apparent upon reading the following detailed description and upon reference to the drawings in which.

DETAILED DESCRIPTION OF SPECIFIC EMBODIMENTS

Figure 1:
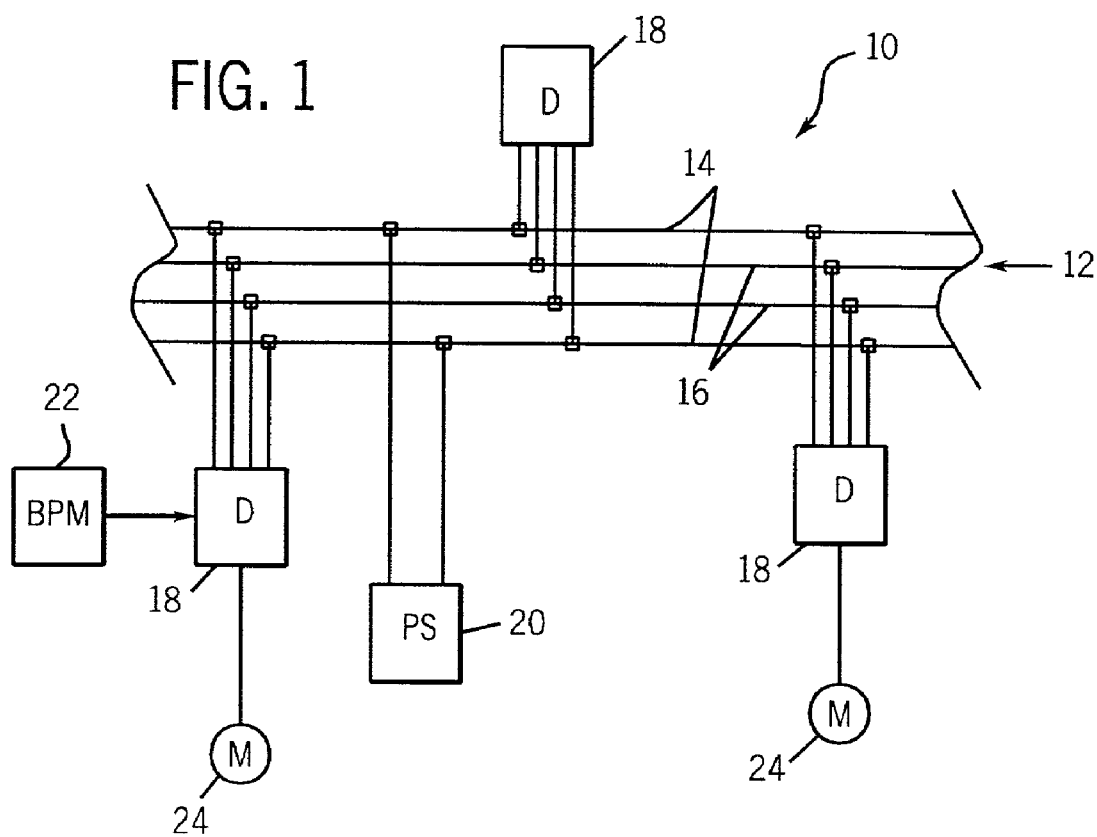
FIG. 1 is a diagrammatical representation of a portion of a control and monitoring network in which devices are provided, one of which includes a secondary or backup power supply.

Turning now to the drawings, and referring first to FIG. 1, a portion of a control and monitoring network 10 is illustrated. Network 10 is particularly well-suited to managing automated functions, such as control and monitoring functions in industrial environments such as manufacturing, material handling, steady flow and batch processes, and so forth. Accordingly, network 10 provides for exchange of power and data signals within the network for appropriate control of the various networked devices. In the implementation illustrated in FIG. 1, cabling, such as a 4-conductor cable 12 is routed among the various networked devices, and includes a pair of power conductors 14 which flank pair of data signal conductors 16. Although various media may be employed, in the present embodiment, data conductors 16 are located between power conductors 14, and all conductors may be terminated at desired locations by insulation displacement connectors (not shown).

Various devices are linked to the cable 12 for supplying or drawing power from the network, and for exchanging data. As illustrated diagrammatically in FIG. 1, a power main or normal supply 20 provides power to the power conductors 14. Various power supplies may be provided in the network, depending upon the lengths of the media employed, spacing between the devices and power supplies, and so forth. Networked devices, represented generally by reference numeral 18, are coupled to both the power and the data conductors of the cable and are designed to carry out specific functions in the network. For example, devices 18 may include switchgear, motor controllers, motor starters, circuit breakers, logic controllers, monitoring stations, and so forth. A supply of backup power from a backup power module 22 in FIG. 1, may be applied to one or more of the devices 18 to ensure the supply of backup power in the event of loss of power from the network. Finally, where devices 18 are installed for regulation of operation of a downstream device, electrical loads, such as motors 24 in the implementation of FIG. 1, are linked to the devices. In general, sufficient power is provided by the network, and by backup power supply module 22, for operation of the devices. Logical signals are also provided by the network via the data conductors 16.

Separate power, typically at higher voltages and current ratings, is supplied to the devices 18 intended to command operation of a load 24.

FIGS. 2–6 illustrate present exemplary implementations of power supply module 22 designed to apply power to networked devices in the event of a loss or malfunction in the power supplied by network cable 12. Various failure modes of the network power may be envisioned. For example, referring again to FIG. 1, cable 12 may become damaged or severed, thereby interrupting power to devices downstream of power supplies 20. Similarly, cabling extending between the primary trunk 12 and particular devices may become damaged or severed. Power supplies 20 may also malfunction or become damaged in operation, thereby removing power or reducing the level of power available to the networked devices. Where such eventualities can be foreseen, and where operation of particular devices 18 warrants, the present technique provides for application of power from a secondary source automatically and without interruption of a power to such devices.

Figure 2:
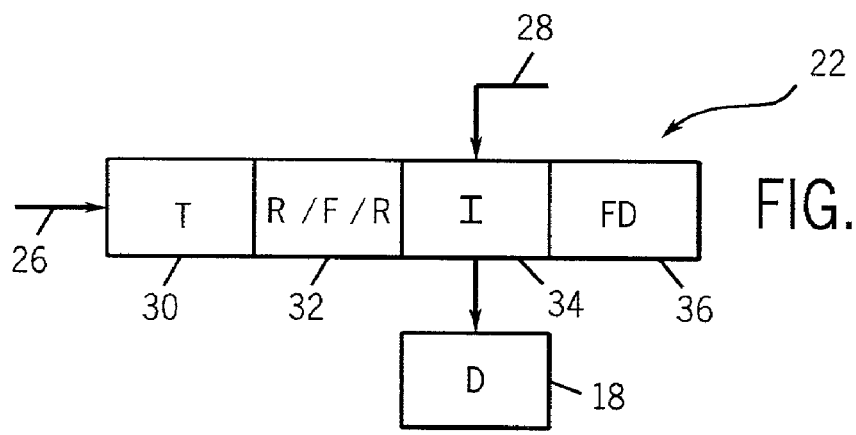
FIG. 2 is a block diagram of an exemplary backup power module in accordance with certain aspects of the present technique.

Referring to the specific exemplary embodiments of FIGS. 2–6, in a first implementation shown in FIG. 2, backup power module 22 includes a connection to a secondary power source 26, and a further connection to the network power source, as represented generally at arrow 28. The secondary power source 26 may include a wide range of power sources as described more fully below. In general, the network power source 28 may be tapped from a network cable 12, or at any particular point along the network or at devices 18.

In the implementation of FIG. 2, secondary power source 26 is applied to an internal transformer 30 of the backup power module 22. The transformer alters the voltage of the incoming power and applies the resulting signals to a rectifier/filter/regulator circuit 32. Output of circuit 32 is then applied to an isolator circuit 34. The isolator circuit 34 effectively compares output of circuit 32 with the network power source 28, and applies power to device 18 based upon a comparison. In a configuration of FIG. 2, the module 22 further includes a fault detection circuit 36. The specific arrangements and operation of the various circuitry of FIG. 2 will be described in greater detail below.

Figure 3:
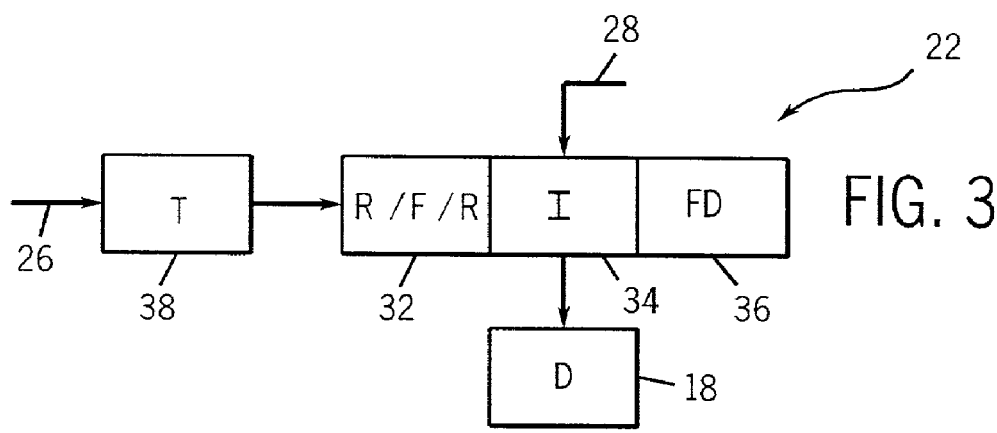
FIG. 3 is a block diagram of an alternative backup power module employing an external transformer.

In an alternative configuration of backup power module 22, shown in FIG. 3, an external transformer 38 is employed. The external transformer applies the altered incoming secondary power to a rectifier/filter/regulator circuit 32 as indicated above with respect to FIG. 2. In a further alternative configuration illustrated in FIG. 4, module 22 includes a control power transformer 40 which conditions and applies power to circuit 32. The control power transformer 40 may also supply power to other devices within the network in a conventional manner.

Figure 5:
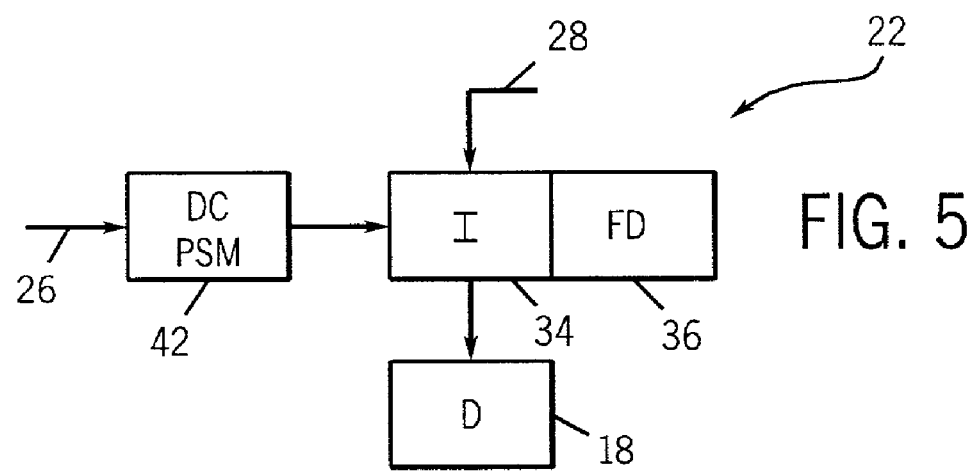
FIG. 5 is a block diagram of a further alternative backup power module employing a DC power supply module as a source of secondary power.
Figure 6:
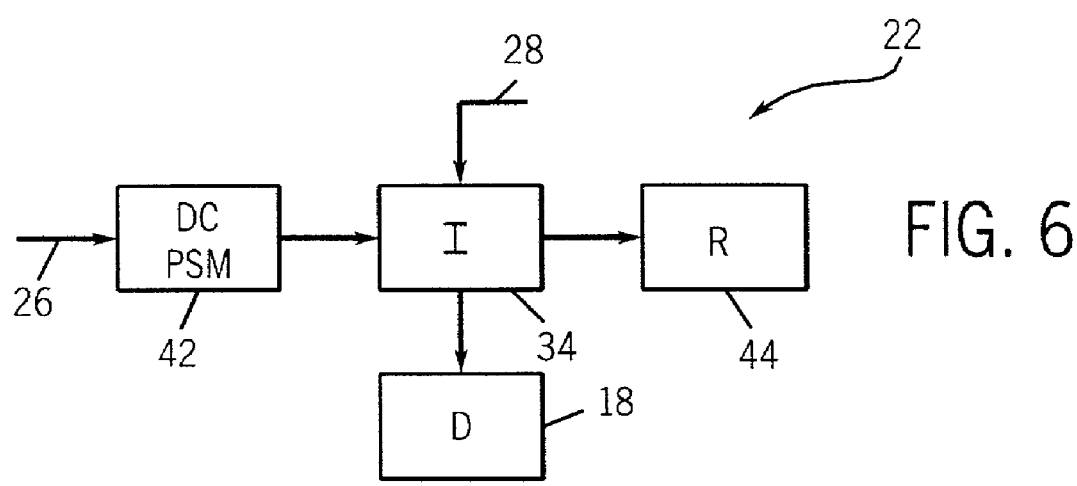
FIG. 6 is a block diagram of a further alternative backup power module including fault relays.

As further alternatives to the implementations described above, the backup power module 22 may employ direct current power supply modules as illustrated in FIGS. 5 and 6. As shown in FIG. 5, the backup power module 22 may thus include a direct current power supply module 42 which outputs power at a level conforming to the desired input of secondary power into the isolator circuit 34. In the implementation of FIG. 6, a similar power supply module 42 is employed, but with fault relay circuitry 44 which may be powered from the power supply module 42 and thereby avoid unnecessary loading the main power supply of the network.

Figure 4:
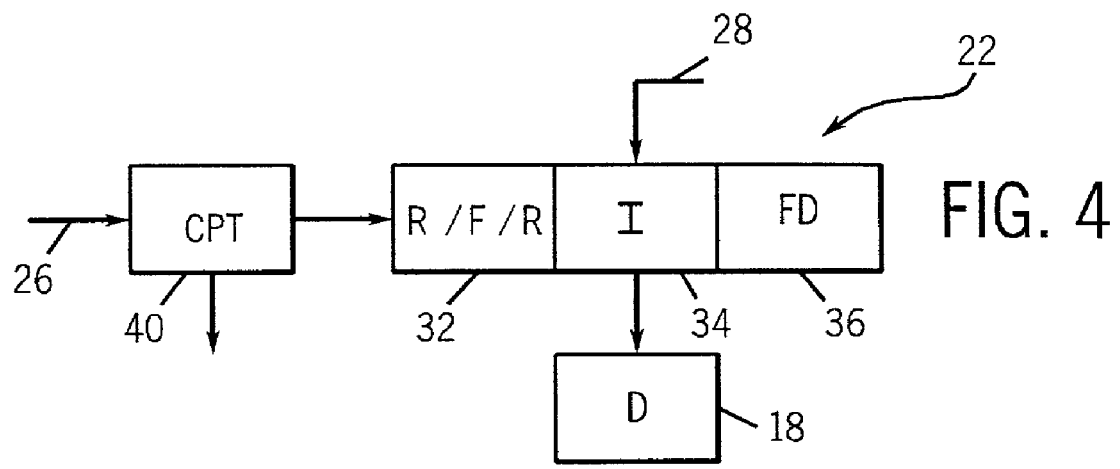
FIG. 4 is a block diagram of a further alternative backup power module employing a control power transformer.

As can be seen from various embodiments discussed above, the backup power module 22 may be adapted to various applications depending upon the desired type of protection and the nature of the secondary power source available. By way of example, in the embodiments shown in FIGS. 2 and 3, a 120 VAC power supply would normally be available to transformers 30 and 38, which may condition the incoming secondary power to 20 VAC. In the implementation of FIG. 4, a control power transformer may receive incoming power, such as a level of 480 VAC, and produce output at a lower voltage level, such as 120 VAC. In the embodiments of FIGS. 5 and 6, incoming power may be supplied to the DC power supply modules 42 at a level of 120 to 240 VAC, with the power supply modules 42 producing an output on the order of 24 VDC. In all cases, power is conditioned in the module to a desired level of secondary power, such that control of switching between application of power from the network and application of power from the secondary power source is uninterrupted and automatic.

Figure 7:
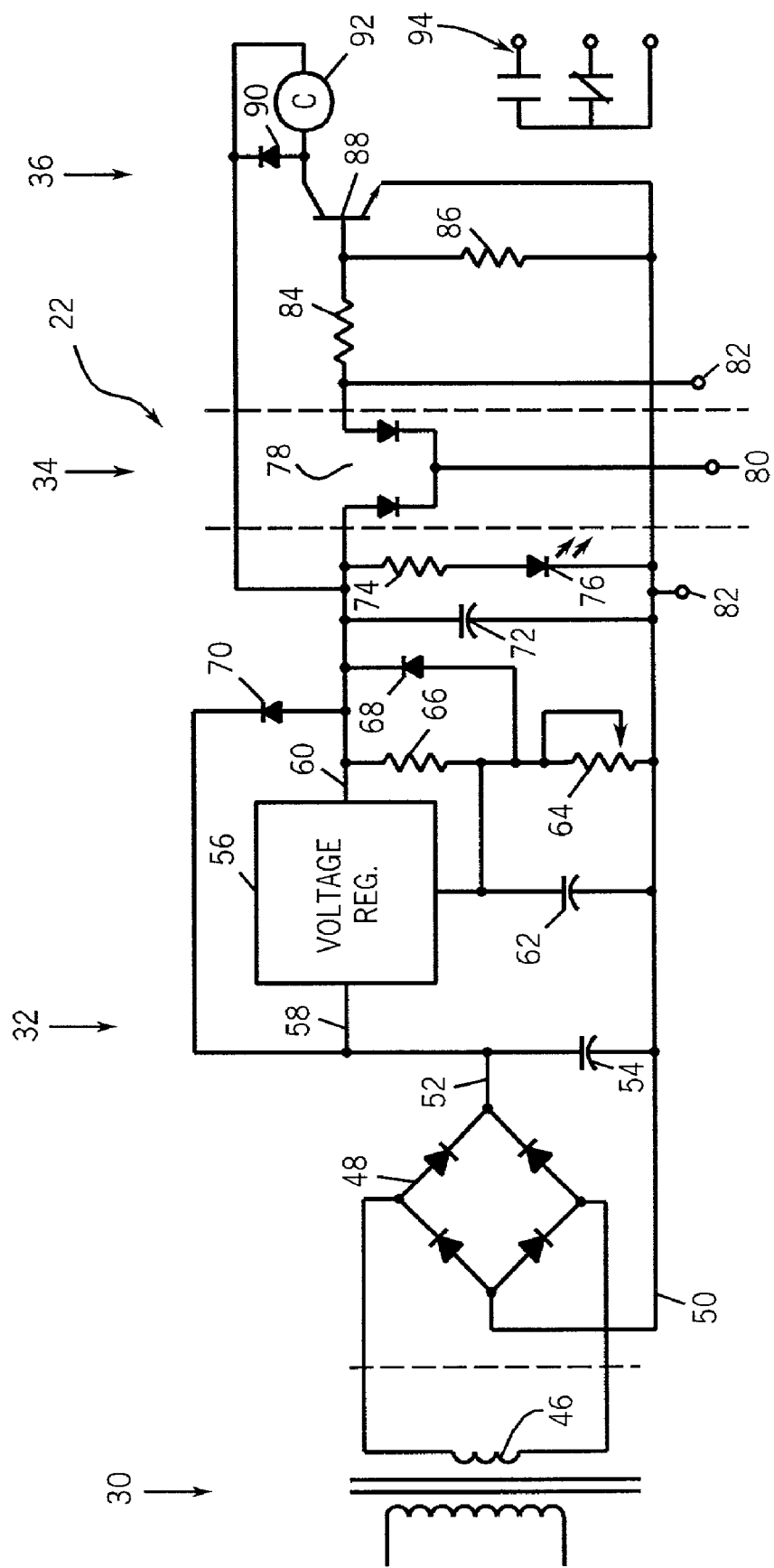
FIG. 7 is a more detailed circuit diagram of the module of FIG. 2.

The components of the backup power module 22 illustrated generally in FIGS. 2–6 are illustrated in somewhat greater detail in FIGS. 7–11, respectively. Referring first to FIG. 7, the backup power module in the illustrated embodiment includes an internal transformer 30, a rectifier/filter/regulator circuit 32, an isolator circuit 34, and a fault detection circuit 36. The embodiment of FIG. 7 is designed to receive power from a power source via internal transformer 30, such as at the secondary windings of the transformer (see windings 46). The transformer 30 transforms the voltage level of the incoming power to a desired level, such as from 120 VAC to 20 VAC. The internal transformer 30 may be mounted on a printed circuit board depending upon the packaging desired for the overall module.

Power from transformer 30 is then applied to circuit 32 which includes a rectifier 48. The rectifier produces DC power which is applied to an output bus having a high side 52 and a low side 50. A filtering capacitor 54, such as a 75 microFarad capacitor serves to smooth the output of rectifier 48. Direct current power is then applied to a voltage regulator 56 at an input side 58 thereof. The voltage regulator removes ripple from the DC power by virtue of an additional filtering capacitor 62, such as a 10 microFarad capacitor. Output from the voltage regulator 56 is available at output line 60. In the illustrated embodiment, the voltage regulator circuitry is adjustable by virtue of resistors 64 and 66. As will be appreciated by those skilled in the art, by appropriate adjustment of resistor 64, output voltage of the regulator circuitry can be adjusted to a desired level. Appropriate adjustment of the voltage may be desired to provide switching between application of normal network power to a device and application of power from the secondary power source. A voltage regulator with a fixed (non-adjustable) output may also be employed once an established voltage has been determined. Circuit 32 further includes a pair of diodes 68 and 70 which offer protection to the regulator 56. Finally, a further noise reduction filtering capacitor 72 is provided, such as a 0.1 microFarad capacitor.

Where desired, various types of human feedback devices may be provided for indicating the operative state of module 22. In the embodiment illustrated in FIG. 7, a current limiting resistor 74 in series with an LED 76 to indicate that the DC bus is currently being powered from the secondary power source. Additional visual or other indicators may be provided for easily detecting whether power is being provided from the secondary power source or from the network power source as described more fully below.

Output from the rectifier/filter/regulator circuit 32 is applied to isolator circuit 34. In a present embodiment, circuit 34 includes a dual diode isolator 78. In the particular embodiment shown, isolator circuit 78 is a Schottke diode circuit providing a low voltage drop, on the order of 0.4 volts. The isolator circuit offers protection against flow through to the downstream device in the event of a short circuit, thereby avoiding the unwanted application of power to the downstream device.

Output of the isolator circuit 78 is provided at terminal 80. Moreover, the normal network power is available at terminals 82. That is, output of the regulator 56 is supplied to one side of isolator circuit 78, while the typically higher voltage of the network power source is applied to the opposite side of isolator circuit 78. Thus, isolator circuit 78 serves as a comparison circuit capable of outputting power at terminal 80 depending upon the balance between the inputs (e.g. voltage levels) from the secondary power source and the network power source.

Fault detection circuit 36 is also coupled to the output of voltage regulator 56 and to the network power source. Circuit 36 thus includes a current limiting resistor 84 and a resistor 86 designed to bias a solid state switch 88. Switch 88 is coupled between the high and low voltage terminals of the network power supply, and is forward biased when the network power supply is normally operative. A relay coil 92 is powered from the backup or secondary power supply through the voltage regulator 56 to provide for an alarm in the event of switching between the normal network power supply and supply from the secondary power source. A diode 90 serves to protect switch 88 when relay coil 92 is switched off. It should be noted that in the illustrated embodiment, relay coil 92 is powered on during normal operation by the backup power module, and in particular by power from the secondary power source. Thus, operation of the alarm relay coil does not burden the main power supply of the network. Power loss relays, as indicated generally at reference numeral 94, are operated under the control of relay coil 92. The relay 94 may be normally open or normally closed, and may be coupled to visual, auditory, or other alarms to indicate to operations personnel that power is being supplied from the secondary power source.

In operation, incoming power from the secondary power source is transformed and conditioned to a desired level for application to isolator circuit 78. The secondary power source portion of module 22 preferably produces power at a voltage level which is lower than the normal voltage level of the network, but which is capable of powering the downstream devices. For example, in a network providing normal power level on the order of 24 VDC, the module 22 may be adjusted to provide backup power at a level on the order of 14 to 20 VDC. Alternatively, the voltage level of the backup power available may be fixed at a predetermined level, with the effective comparison made by isolator circuit 78 being with this fixed predetermined level.

Figure 8:
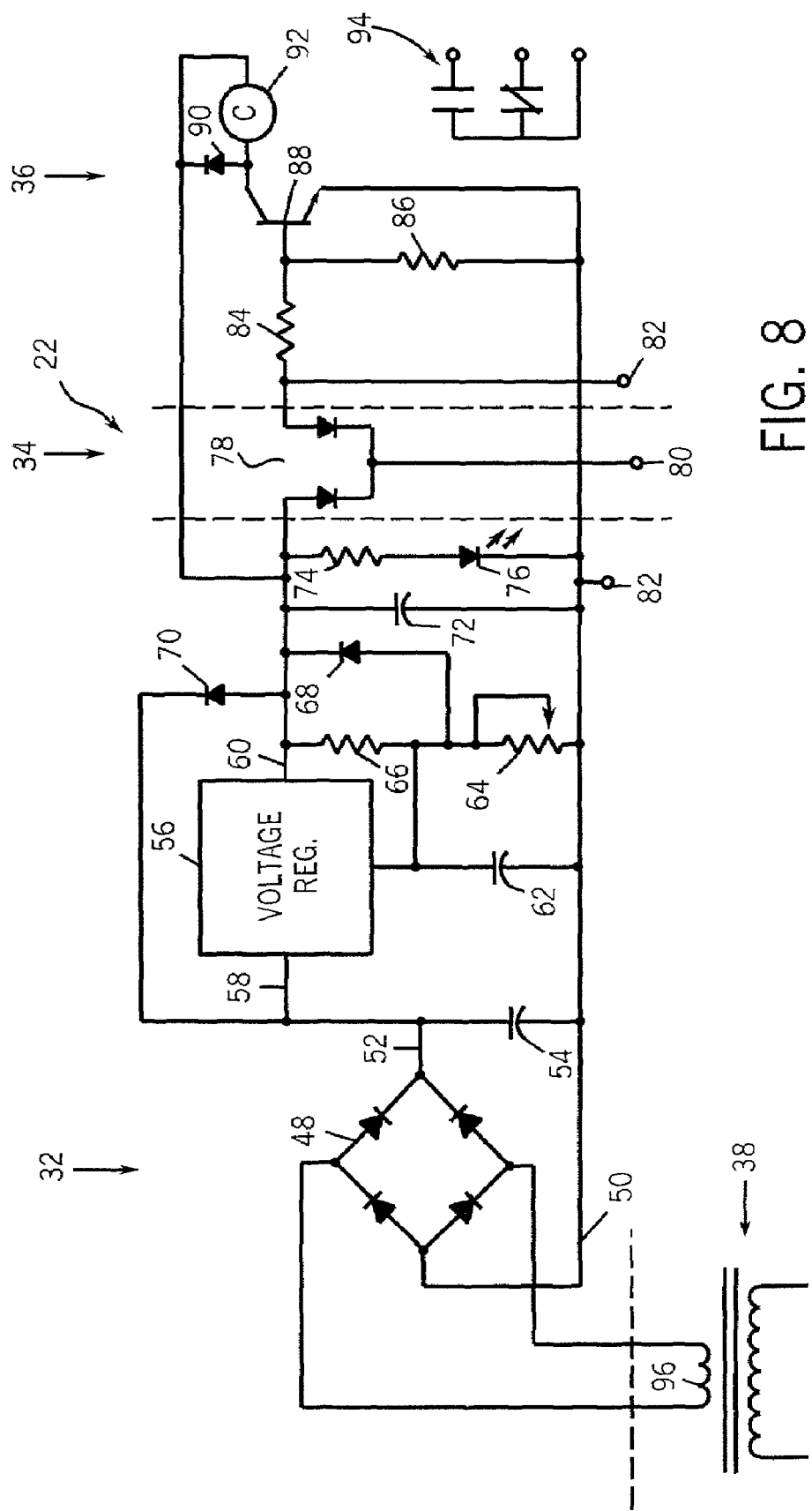
FIG. 8 is circuit diagram of the module of FIG. 3.

During normal operation, current flows from the network to the output terminal 80. When the voltage level of the secondary power source exceeds the voltage available from the network, on the other hand, isolator circuit 78 channels current to the output from the voltage regulator circuit without interruption of power to the downstream device. When the network power supply voltage level is thus reduced, the base of switch 88 goes low, and the relay coil 92 is de-energized, permitting an alarm or other indication to be powered through relay 94. FIG. 8 illustrates a variation of the circuitry of FIG. 7 in accordance with the diagram of FIG. 3. In particular, in the embodiment shown in FIG. 8, all circuits 32, 34 and 36 are substantially identical to the circuitry described above, but rectifier 48 receives power from a separate source, such as from windings 96 of an external transformer 38. In a present embodiment, external transformer 38 includes windings 96 for transforming incoming power from a level of 120 VAC to a level of 20 VAC. The transformed power is then applied to rectifier 48 as described above.

Figure 9:
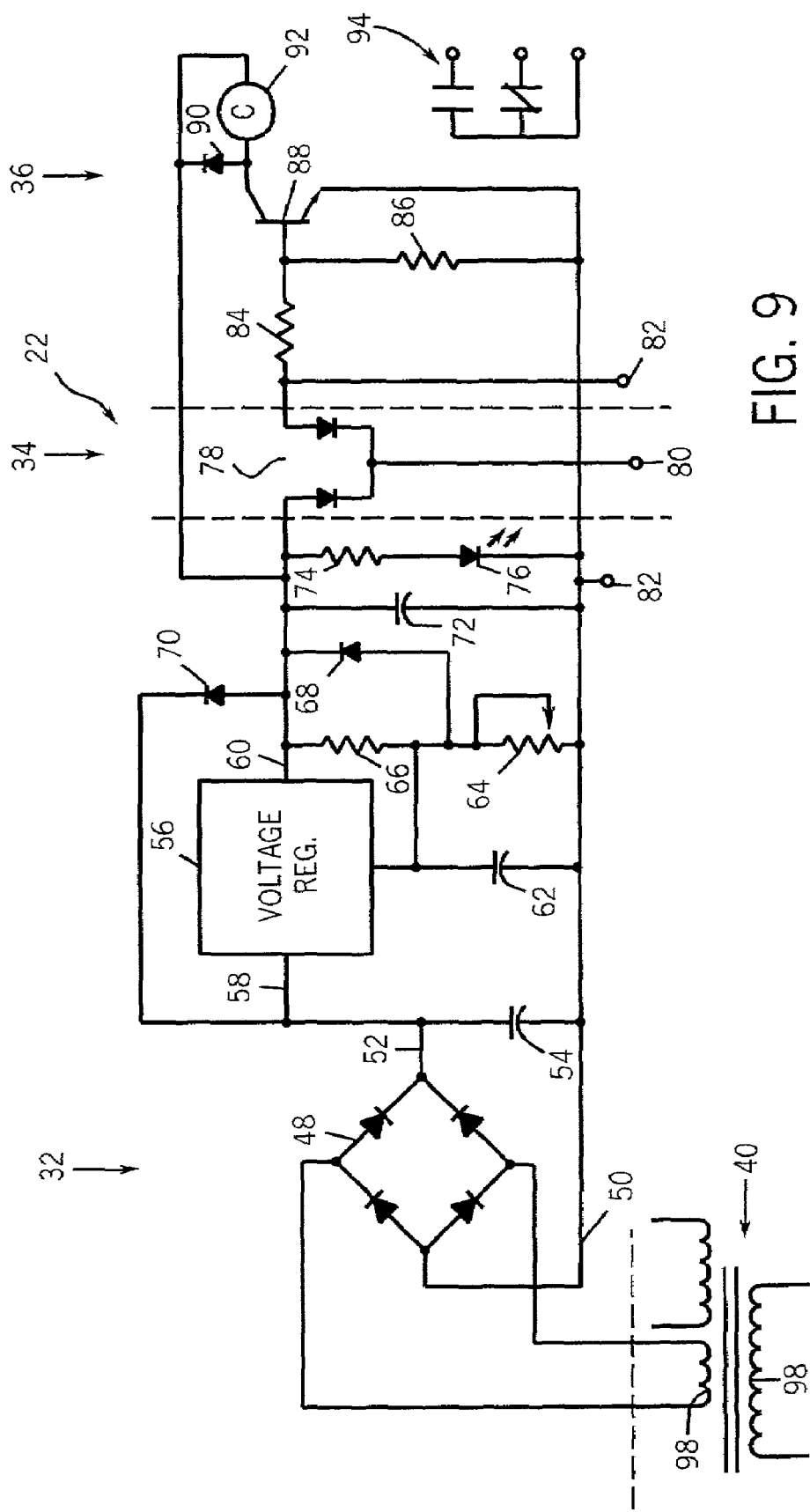
FIG. 9 is a circuit diagram of the module of FIG. 4.

In the embodiment illustrated in FIG. 9, the circuits 32, 34 and 36 are again identical to those described with reference to FIG. 7, but power from windings 98 of a control power transformer 40 are applied to rectifier 48. In a present implementation, the windings 98 of the control power transformer provide for input of 480 VAC and output of 20 VAC. Other windings within the control power transformer may provide output on the order of 120 VAC.

Figure 10:
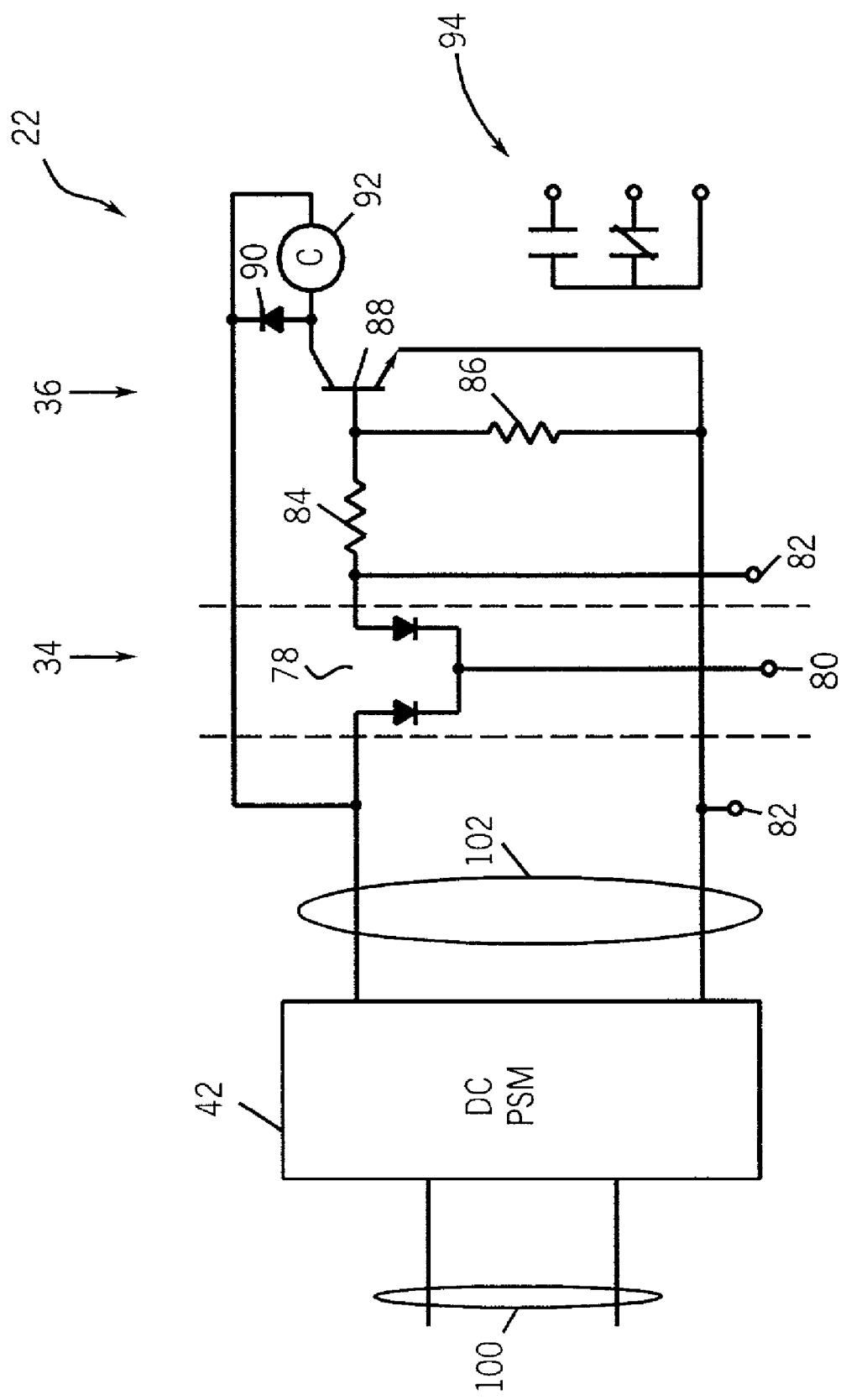
FIG. 10 is a circuit diagram of the module of FIG. 5.

The embodiment illustrated in FIG. 10 is identical to the former embodiments in so much as the isolator circuit and fault detection circuit 36 are concerned. However, as shown in FIG. 10, where a DC power supply module 42 is available, incoming power may be supplied to the module as indicated at reference numeral 100, such as in the form of 120–240 VAC. The DC power supply module 42 then provides output at high and low sides of a bus 120, such as at a desired voltage level of 24 VDC. Alternatively, a voltage regulator may be provided within the DC power supply module or external to the module for adjustment of the power from the secondary power source to a desired level, such as below the normal network voltage level.

Figure 11:
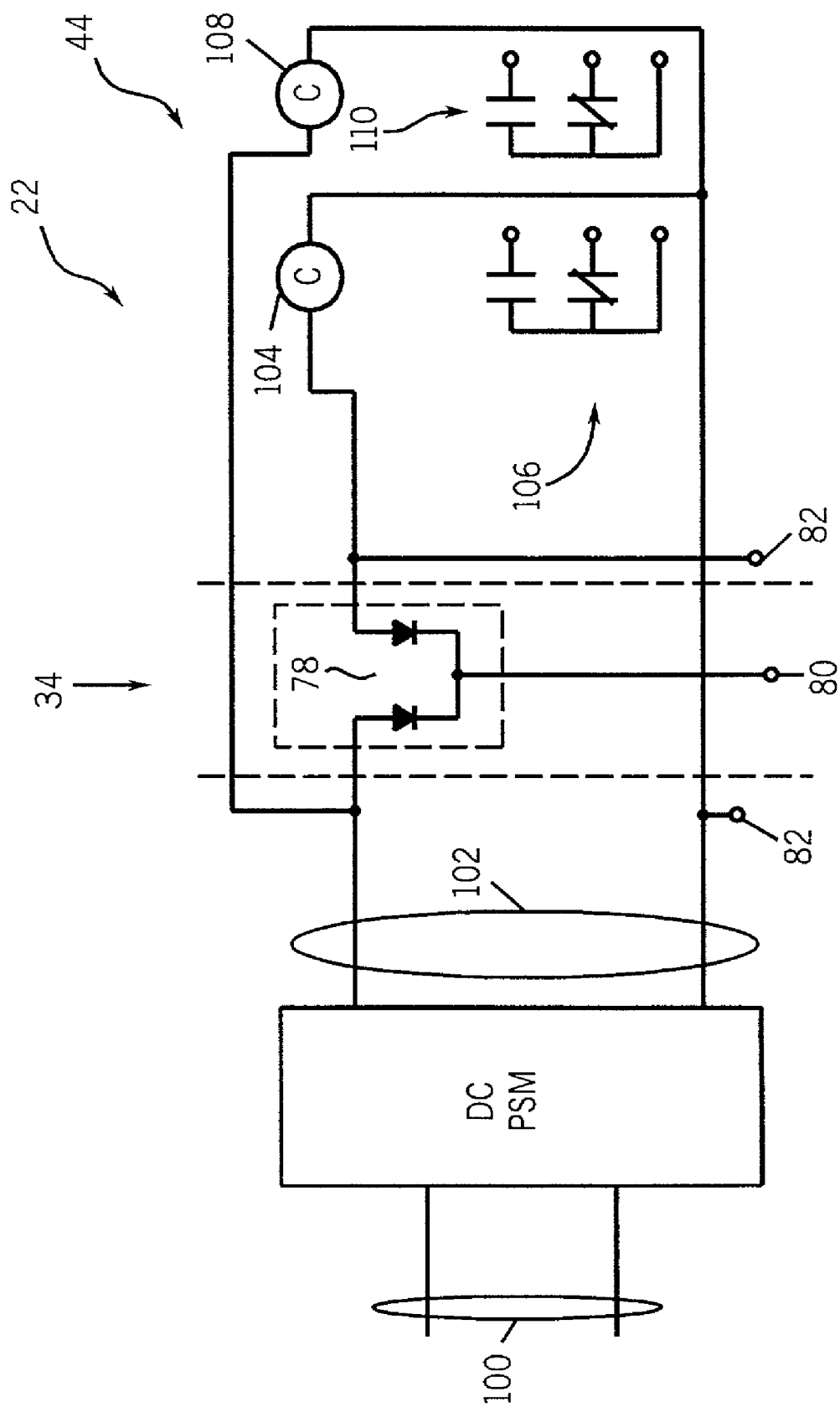
FIG. 11 is a circuit diagram of the module of FIG. 6.

The embodiment of FIG. 11 provides a series of fault relays. In the embodiment shown in FIG. 11, a DC power supply module is again employed as in the embodiment of FIG. 10. However, a pair of relays are provided for indicating fault conditions. In the illustrated embodiment these include a first relay coil 104 coupled to the network power supply terminal, along with a corresponding relay 106. A second coil 108 is coupled to the backup or secondary power source and is accompanied by corresponding relay 110. The use of two relay coils and associated relays as illustrated in FIG. 11 affords visual, auditory, or other alarms or output signals to indicate that the network power supply is operative or inoperative, and that the backup power supply is operative or inoperative.

As will be appreciated by those skilled in the art, various portions of the modules described above may be combined or altered to accommodate specific application needs. For example, relays or other circuitry may be provided in any of the described embodiments to indicate the operative state of the module, the network or secondary power supply, which power supply is currently coupled to the downstream device. Similarly, the module described herein may be configured as a separate and independent component, or may be incorporated into various networked components or power supplies coupled to the network.

While the invention may be susceptible to various modifications and alternative forms, specific embodiments have been shown in the drawings and have been described in detail herein by way of example only. However, it should be understood that the invention is not intended to be limited to the particular forms disclosed. Rather, the invention is to cover all modifications, equivalents, and alternatives falling within the spirit and scope of the invention as defined by the following appended claims.

What is claimed is:

1. A power module for a control and monitoring network, the module comprising:

a network power circuit configured to provide direct current network power at a network voltage level to a data and power network;

a secondary power circuit configured to convert alternating current power from a power source to direct current secondary power at a secondary voltage level;

an output circuit configured to apply power to a networked component from either the data and power network, or the secondary power circuit; and a comparison circuit configured to compare the network voltage level and the secondary voltage level and to transition application of power to the networked component from the data and power network to application of power from the secondary power circuit based upon the comparison.

2. The power module of claim 1, wherein the comparison circuit is configured to cause the output circuit to apply no power to the networked component if the network voltage level exceeds the secondary power level.

3. The power module of claim 1, wherein the comparison circuit is configured to cause the output circuit to apply no power to the networked component if the network voltage level exceeds a predetermined level.

4. The power module of claim 1, wherein the secondary power circuit provides a power at a level below a normal operating range of the network voltage level.

5. The power module of claim 4, wherein the normal operating range is between approximately 16 volts and 24 volts.

6. The power module of claim 1, wherein the secondary power circuit includes a dual diode isolator.

7. The power module of claim 1, wherein the secondary power circuit includes a rectifier and regulator circuit for converting alternating current power to direct current power at the secondary voltage level.

8. The power module of claim 1, wherein the secondary power circuit includes an adjustable circuit for adjusting the secondary voltage level.

9. The power module of claim 1, wherein the secondary power circuit includes a voltage transformer.

10. The power module of claim 1, further comprising an alarm circuit for indicating that power is being applied to the networked device from the secondary power circuit.

11. The power module of claim 1, further comprising a visual indicator for indicating that power is being applied to the networked device from the secondary power circuit.

12. A networked backup power module for a data and power network, the network providing data and power signals to a networked component, the module comprising:

a network interface circuit configured for connection to a network data and power cable and for detecting a network voltage level of direct current network power;

a secondary power circuit configured to receive and condition power from an alternating current power source and that converts power from the power source to direct current power at a secondary power level;

an output circuit configured to apply power to a networked component coupled to the network and normally receiving power from the network; and a comparison circuit configured to compare the network voltage level to a desired voltage level and to transition application of power to the networked component from the data and power network to application of power from the secondary power circuit based upon the comparison.

13. The power module of claim 12, wherein the desired voltage level is the secondary voltage level.

14. The power module of claim 12, wherein the secondary power circuit maintains the secondary voltage level at a predetermined amount below a normal operating range of the network voltage level.

15. The power module of claim 12, further comprising an alarm circuit for indicating that power is being applied to the networked device from the secondary power circuit.

16. The power module of claim 12, further comprising a visual indicator for indicating that power is being applied to the networked device from the secondary power circuit.

17. The power module of claim 12, wherein the normal operating range is between approximately 16 volts and 24 volts.

18. The power module of claim 12, wherein the secondary power circuit includes a dual diode isolator.

19. The power module of claim 12, wherein the secondary power circuit includes a rectifier and regulator circuit for converting alternating current power to direct current power at the secondary voltage level.

20. The power module of claim 12, wherein the secondary power circuit includes an adjustable circuit for adjusting the secondary voltage level.

21. The power module of claim 12, wherein the secondary power circuit includes a voltage transformer.

22. The backup power module for an industrial control and monitoring network, the module comprising:
    a network interface circuit configured for connection to a network data and power cable and for detecting a network voltage level of direct current network power;
    a secondary power circuit configured to receive and condition alternating current power from a power source to direct current power at a secondary voltage level;
    an output circuit configured to apply power to a networked component coupled to the network and normally receiving power from the network; and
    a comparison circuit configured to compare the network voltage level to the secondary voltage level and to transition application of power to the networked component from the network to application of power from the secondary power circuit upon the comparison.

23. The module of claim 22, wherein the output circuit applies power from the secondary power source circuit when the secondary voltage level exceeds the network power level.

24. The module of claim 22, wherein the secondary power circuit includes a rectifier and regulator circuit.

25. The module of claim 24, wherein the regulator circuit is adjustable to adjust the secondary voltage level.

26. The module of claim 22, wherein the secondary power circuit includes a power transformer.

27. The module of claim 22, wherein the output circuit includes a dual diode isolator.

28. The module of claim 22, comprising a visual indicator for indicating that power is being applied to the networked component from the secondary power source circuit.

* * * * *